United States Patent
Koller (10) Patent No.: US 12,242,087 B2
(45) Date of Patent: Mar. 4, 2025

(54) OPTICAL DEVICE WITH A FIRST LIGHT GUIDE THAT OUTPUTS TO A SECOND LIGHT GUIDE AND METHOD OF USING THEREOF

(71) Applicant: Osram Continental GmbH, Munich (DE)

(72) Inventor: Michael Koller, Hemau (DE)

(73) Assignee: Osram Continental GmbH, Munich (DE)

( * ) Notice: Subject to any disclaimer, the term of this patent is extended or adjusted under 35 U.S.C. 154(b) by 9 days.

(21) Appl. No.: 17/439,403

(22) PCT Filed: Mar. 17, 2020

(86) PCT No.: PCT/DE2020/100209
§ 371 (c)(1),
(2) Date: Sep. 15, 2021

(87) PCT Pub. No.: WO2020/187367
PCT Pub. Date: Sep. 24, 2020

(65) Prior Publication Data
US 2024/0217432 A1  Jul. 4, 2024

(30) Foreign Application Priority Data

Mar. 19, 2019  (DE) .......................... 102019107001.5

(51) Int. Cl.
*B60Q 3/14* (2017.01)
*B60K 35/10* (2024.01)
(Continued)

(52) U.S. Cl.
CPC ............ *G02B 5/0278* (2013.01); *B60K 35/10* (2024.01); *B60Q 3/14* (2017.02); *B60Q 3/64* (2017.02);
(Continued)

(58) Field of Classification Search
CPC ... B60Q 3/14; B60Q 3/64; B60Q 3/82; B60Q 1/503; B60Q 3/62; B60Q 1/0058;
(Continued)

(56) References Cited

U.S. PATENT DOCUMENTS 11,360,258 B1 *  6/2022  Huwe ................... G02B 6/0068
2008/0112187 A1 *  5/2008  Katsumata ........... G02B 6/0076
362/611
(Continued)

FOREIGN PATENT DOCUMENTS

CN  201435069 Y  4/2009
CN  101452146 A  6/2009
(Continued)

OTHER PUBLICATIONS

English translation of the Int'l Preliminary Report on Patentability prepared by the European Patent Office in the international application PCT/DE2020/100209 as forwarded to the Int'l Bureau of WIPO on Sep. 16, 2021 (9 pages).
(Continued)

*Primary Examiner* — Abdulmajeed Aziz
*Assistant Examiner* — Steven Y Horikoshi
(74) *Attorney, Agent, or Firm* — Imperium Patent Works; Darien K. Wallace (57) ABSTRACT

An optical device including at least two optical systems comprising a respective light source that is individually controllable. Furthermore, a respective optical system includes a light guide into which the light of the respective light source can be input. Additionally, a respective optical system has a light output side, and the second optical system additionally has a light input side into which light exiting from the light output side of the first optical system irradiates. Moreover, an image mask is arranged between the optical systems, the image mask being provided in the optical path between the light output side of the first optical system and the light input side of the second optical system.

16 Claims, 3 Drawing Sheets

(51) Int. Cl.
*B60Q 3/64* (2017.01)
*B60Q 3/82* (2017.01)
*G02B 5/02* (2006.01)
*B60Q 1/30* (2006.01)
*B60Q 1/50* (2006.01)

(52) U.S. Cl.
CPC .......... *B60Q 3/82* (2017.02); *B60K 2360/332* (2024.01); *B60Q 1/30* (2013.01); *B60Q 1/503* (2013.01)

(58) Field of Classification Search
CPC ............... G02B 6/0075; G02B 6/0076; G09F 2013/1831; B60K 2360/33; B60K 2360/332; B60K 2360/34; B60K 35/21; B60K 35/212; B60K 35/213; B60K 35/214; B60K 35/215; G01D 11/28; H01H 2219/039; H01H 2219/062; H01H 13/023; H01H 13/083; H01H 2013/026; H01H 19/025; H01H 19/18; H01H 19/182; H01H 2231/026; H04M 1/22
See application file for complete search history.

(56) References Cited

U.S. PATENT DOCUMENTS

| | | | | |
|---|---|---|---|---|
| 2011/0194167 A1* | 8/2011 | Jackson | ................. | G02B 27/01 359/290 |
| 2014/0268629 A1* | 9/2014 | Krishnaswamy | .... | G02B 6/0076 362/23.1 |
| 2015/0199041 A1* | 7/2015 | Salter | .................... | B60K 35/00 345/174 |
| 2016/0216434 A1 | 7/2016 | Shih et al. | ........... | G02B 6/0076 |
| 2016/0325674 A1* | 11/2016 | Krull | ........................ | B60Q 3/64 |
| 2017/0365101 A1 | 12/2017 | Samec et al. | ......... | G06T 19/006 |
| 2018/0096503 A1 | 4/2018 | Kaehler et al. | ......... | G06T 11/60 |
| 2018/0357040 A1* | 12/2018 | Spiewla | ................. | B60K 35/10 |
| 2018/0372628 A1* | 12/2018 | Craig | ................... | G02B 6/0063 |
| 2020/0189450 A1* | 6/2020 | Jeon | ........................ | B60Q 3/85 |

FOREIGN PATENT DOCUMENTS

| | | |
|---|---|---|
| CN | 105992473 A | 2/2015 |
| DE | 202014003904 U | 8/2014 |
| WO | WO 2017/134412 | 8/2017 |

OTHER PUBLICATIONS

Office action of the Chinese Patent Office in the related Chinese patent application CN202080022642.5 dated Nov. 24, 2022, as well as the English translation of the Chinese Office action (16 pages).
Office action of the German Patent Office in the related German patent application DE102019107001.5 dated Feb. 1, 2023, as well as the English translation of the German Office action (8 pages).
Office action of the Chinese Patent Office in the related Chinese patent application CN202080022642.5 dated May 7, 2023, as well as the English translation of the Chinese Office action (16 pages).
Florian Schaeffer, "LED 'Nixie' Display" in Make: Projects, Nov. 7, 2018, downloaded from https://makezine.com/projects/led-nixie-display/, XP055705419 (15)pages ).
International Search Report dated Jul. 13, 2020 from the European Patent Office in the related PCT application PCT/EP2020/100209 (11 pages).

* cited by examiner

OPTICAL DEVICE WITH A FIRST LIGHT GUIDE THAT OUTPUTS TO A SECOND LIGHT GUIDE AND METHOD OF USING THEREOF

CROSS REFERENCE TO RELATED APPLICATION

This application is a U.S. National Stage entry under 35 U.S.C. § 371 based on International Application No. PCT/DE2020/100209, filed on Mar. 17, 2020, which was published under PCT Article 21(2) and which claims priority to German Application No. 102019107001.5, filed on Mar. 19, 2019. The disclosure of each of the foregoing documents is incorporated herein by reference.

TECHNICAL FIELD

The invention relates to an optical device comprising at least two optical systems. Furthermore, the invention starts out from an assembly with optical devices, a vehicle with the optical device, and a method for interaction with the optical device.

BACKGROUND

In order to inform an observer, and/or to display messages to an observer, and/or to excite attention with an observer, for instance, plastered areas, e.g., an affixed advertising or, for instance, also displays and/or screens may be used. The representation of the plastered areas can, however, not be changed so that the observer can be provided exclusively with ready-made information and/or messages. Furthermore, it is difficult to generate a particular degree of attention with a plastered area since the observer might, for instance, get accustomed to it and will thus no longer perceive the information and/or messages. When using screens or displays for displaying information or messages, also advertising messages, an observer's attention may be directed easily to the display or to the screen. These are, however, often expensive and are partially difficult to integrate in various surfaces, especially if they are curved.

It is an object of the present invention to provide an optical device that is simple with respect to the technology of the device and cost-efficient and that is capable of imaging information. It is another object to provide an assembly with this optical device, and a vehicle with this optical device, and a method for interaction with the optical device.

The object with respect to the optical device, the assembly, the vehicle and the method is solved by the features of the claims.

SUMMARY

In accordance with the invention an optical device is provided that includes at least one first and one second optical system. The optical systems each have at least one light source, for instance, an LED (light-emitting diode) and/or an OLED (organic light-emitting diode), wherein these are controllable independently and/or individually of each other. Furthermore, a respective optical system includes at least one respective light guide, wherein the light of the respective light source can be input into the light guide. The respective optical systems additionally include a respective light output side, wherein the light output sides are in particular substantially or completely parallel to each other. The second optical system includes, in addition to the light output side, at least one light input side into which light which exits in particular from the light output side of the first optical system can irradiate. In other words, the light of the light source of the first optical system may enter via the light guide of the first optical system and the light output side of the first optical system into the second optical system, in particular into the light guide of the second optical system, via the light input side. An image mask may be provided between the two optical systems, more exactly in the optical path between the light output side of the first optical system and the light input side of the second optical system. The image mask projects information or messages.

It is an advantage of this invention that an observer perceives the image mask and/or a picture of the image mask in particular situations only, especially when the light source of the first optical system is switched on, and the light source of the second optical system is not switched on. Thus, it is easy to direct an observer's attention to the optical device because the picture perceived by the observer when observing the optical device is changeable. Another advantage is that the observer can be shown information or messages contained in the image mask depending on the situation. It is, for example, possible that the image mask includes a warning notice that may flash up in a vehicle in the case of excessive speed, for instance, so that this can be displayed to the observer who may in this case be a driver. Another advantage of the invention is that the optical device may, in addition to displaying information or messages, also be used as an interior lighting and/or ambient lighting, e.g., when the light source of the second optical system glows. Then, the observer perceives an especially homogeneous glowing face.

In summary, the optical device may be operated in three different modes. In a first mode, the optical device is switched off, and an observer then does not perceive or at least hardly perceives it. In a second mode, the light source of the first optical system may be switched on while the light source of the second optical system is not switched on, and thus the image mask that projects messages or information is visible to the observer. In a third mode, the light source of the second optical system is switched on, wherein the light source of the first optical system may not be switched on or may be switched on, and thus the optical device appears as a glowing face and may be used as an illumination. It is additionally advantageous that increased attention may be produced with the observer due to the three modes, especially higher attention than in the case of a printed or plastered area. At the same time, the optical device is more cost efficient than, for instance, a screen or a display, especially a high-resolution one. Additionally, the optical device may be used in environments with partially critical conditions, such as, for instance, increased temperature and/or increased probability of mechanical damages, since the optical device includes altogether only few components and preferably no components that are, for instance, thermally sensitive and/or might splinter and/or be destroyed in the case of a mechanical impact. This is especially possible because the optical device does not include any screen components, such as, for instance, an LCD panel. In other words, the optical device enables information or messages to be displayed with high failure safety and high vandalism proofness. Another advantage of the optical device, especially as compared to LCD screens, is that the optical device is efficient. This means that the light of the light sources can be used efficiently, for instance, because no losses by polarization dependency occur, as is the case with LCD screens. This means further that the optical device can be used in an energy efficient manner.

The image mask may, for instance, be a GOBO (graphical optical blackout) or a diapositive. This is of advantage because the image mask is thus cost efficient, and the optical device is therefore also cost efficient. If the image mask is a diapositive, it is also possible to display, via the optical device, a message or a picture, for instance, which is colorful and includes different colors. In a further embodiment, the image mask may also be electrically contactable or controllable so that the message or the information of the image mask is changeable.

It is further conceivable to coat the optical device at least partially or substantially completely so that it is not attacked chemically by particular substances. This has the advantage that it is usable in chemically critical environments.

The shape of the optical device altogether and/or at least its surface may preferably be adapted to a surface in or at which it may be integrated. In other words, it is possible that the optical device may, for instance, be especially slightly curved. Thus, the optical device can, for instance, be easily used in dashboards, especially in regions in which the dashboard is curved. An integration of the optical device in a door panel of a vehicle and/or in a roof liner is also conceivable.

The light guides may, for instance, preferably be made of polymethylmethacrylate (PMMA) and/or polycarbonate (PC) and/or of another transparent thermoplastic plastic material.

A respective optical system may preferably be formed as a layer, wherein at least two layers that lie on top of each other form the optical device.

Moreover, optical structures may be arranged on/in the image mask. With these optical structures it may be possible to display a hologram and/or a three-dimensional image to the observer.

In addition to the first optical system and the second optical system, the optical device may include at least a third optical system that is arranged in particular between the first and the second optical systems. In other words, an optical device may be built of a plurality of optical systems. An image mask that especially formed as a layer is disposed between two other layers. The structure of the optical device with at least three optical systems yields a plurality of design possibilities. A progress indicator may, for instance, be displayed, for example, with a plurality of progress bars, wherein one progress bar each is displayed on a respective image mask, and this one can be allocated to a particular optical system. In other words, for instance, a progress bar indicating, for example, a progress of 10 percent may be displayed between the second optical system and the next following optical system that follows the second optical system contrary to the direction of radiation. The progress bar indicating a 20 percent progress may be arranged between this optical system and the next optical system. The progress bars are in particular arranged in an offset manner. If, for instance, the light source of the optical system that forms a layer in the middle and/or approximately in the middle of the optical device is switched on, it may, for instance, be displayed that half the progress has been achieved in that the light of the light source of the middle optical system radiates through the light guide of the middle optical system, a first image mask following the light guide of the middle optical system in the direction of the optical path, the following optical path of the optical system following the middle optical system in the direction of the optical path, the following image mask, etc. The observer can thus perceive all image masks that are reached by the light of the light source of the middle optical system and that follow the middle optical system in the direction of the second optical system.

In order for the light of the light source of the first optical system to be input into the second optical system via the light guide, it is advantageous for the light output side of the first optical system to be positioned opposite to the light input side of the second optical system. The image mask may then be arranged between the light output side of the first optical system and the light input side of the second optical system.

It is further advantageous if the light guide includes two large surfaces, wherein one of the large surfaces is the light output side of the light guide, and the other is the respective light input side of the respective light guide. The large surfaces may, moreover, have different shapes, such as, for instance, rectangular, quadrangular, square, polygonal, freeform, round, or, for example, also a curved round area. The two large surfaces are additionally preferably connected by a circumferential side face.

The light of the assigned light face may couple into the circumferential side face. This is of advantage since the light sources are thus not visible to the observer, i.e., the light waves may, for instance, be covered so that they are not visible to the observer.

In a further embodiment, it is possible that the light output side of the second optical system is, in the radiation direction, also followed by an image mask. This means, as soon as one of the light sources of the optical systems emits light, the observer will see this image mask. In other words, the possibility of a permanent display of a symbol, information, or a message, which may be supplemented on demand by contents, information, symbols, or messages of at least one further image mask, results if a light source of a further optical system, for instance, the first optical system, emits light. This may be used in a vehicle, for example. For instance, in a normal operation of a vehicle, a vehicle may, for instance, be displayed by the optical device that is displayed on the image mask following the second optical system in the optical path, and in a situation of danger and/or in the case of a defect of the vehicle a warning signal may, for instance, be displayed additionally in that, for example, the light source of the first optical system is switched on and that of the second optical system is switched off, and an image mask with a warning signal is arranged between the light guides of both optical systems.

Furthermore, a part of the optical systems may include at least one light influencing layer. It may, for instance, be a prismatic film adapted to increase the perception of brightness of the irradiated light of the light sources for the observer. These are, for instance, called brightness enhancement films (BEF). Due to the light influencing layer, it is possible to design the optical device more efficiently, i.e., the light of the light sources is used more efficiently, and thus energy may be saved, for example, by using a light source that requires little current supply. Additionally, it is also possible for all optical systems to include at least one BEF or one light influencing layer.

It is also advantageous to form at least a part of the optical systems layer-wise from a respective light guide and the light influencing layer, wherein the layer-wise structure of the optical systems is especially designed such that the light of the respective light source of the respective optical system first enters into the light guide and from a light output side of the light guide into a light input side of the light influencing layer. This structure is advantageous especially in the first optical system. Due to the structure, the light of a respective light source of the optical system that is output by the light influencing layer may appear brighter to the observer.

It is additionally also possible for each respective optical system to include at least two light sources. The light sources are especially controllable individually. Thus, for instance, an animation can be performed that is produced, for example, by multiple optical systems each having the same number of light sources, where the light sources of the multiple optical systems have the same position and are operated in an inverted manner. In other words, the second optical system may, for instance, include five light sources and the first optical system also has five light sources, wherein they are operated, for example, such that one light source of the first optical system always glows, for instance, and at the same time the light sources of the second optical system glow which, in a direction perpendicular to the light output side of the second optical system, do not have the same position as the light source of the first optical system which is switched on. If the light sources of the optical systems are controlled such that, for instance, continuously from one side to the other side a light source of the first optical system glows and, inverting thereto, the light sources of the second optical system glow, a dynamic chaser light may, for instance, be produced, wherein the image mask is always partially displayed. This is particularly advantageous because the observer's attention can thus be strongly directed to the optical device. Preferably, this may be designated as a fourth mode of the optical device. In order to produce a particular effect, especially to direct an observer's attention to the optical device, the four modes may be performed in an arbitrary order.

It is further advantageous for the first optical system to include a reflector positioned on the opposite side of the light output side of the first optical system at the light guide. In other words, it is advantageous if the optical device includes a reflector disposed on the opposite side of the light output side of the first optical system. Thus, light that does not radiate in the direction of the light output side may be directed in the direction of the light output side, and thus the efficiency of the optical device may be improved. Additionally, either the first optical system may include the reflector, or the reflector may be included in the entire optical device. The reflector is in particular a white reflector.

Preferably, at least one light source of an optical system of the optical device irradiates light of a different color than another light source of the optical device. In other words, an optical device may include light sources irradiating different colors, and/or light sources of different optical systems may irradiate different colors. This is, for instance, of advantage if the observer's attention is to be drawn to an exceptional situation and/or to an alarm situation by the optical device. Thus, for instance, the optical device might irradiate white light in a normal situation and, for instance, red light in an alarm situation. The pictures and/or the information and/or the messages displayed by the optical device may be the same or different.

It is also advantageous for the optical device to include at least one input possibility. The input possibility may, for example, be a camera that captures in particular movements of the observer and subsequently controls, for instance, different light sources of different optical systems so as to display information and/or a desired message for the observer, for example. It is, for instance, possible that the optical device is first in the third mode in which the optical device is an ambient illumination, for example, and, by the gestures captured by the camera, the observer may request information and/or messages that are displayed by the optical device. In a further embodiment, the input possibility may be a sensor whose current supply and/or contacts may, for instance, be led off laterally in the direction of the light source, especially a sensor layer which may, for instance, be integrated into the second optical system, especially such that an observer can touch the sensor film. The sensor film may be designed to be pressure-sensitive or capacitive. The operation by an observer, however, may produce the same effects as the operation of a camera by gestures. In other words, different light sources of different optical systems may be switched on and/or off by the operation of the observer. This is particularly advantageous because a message and/or information is thus visible only if the observer gives an instruction, and if it is not desired, then the optical device may be in the first mode or in the third mode and does not create a distraction, for instance, if the observer guides the vehicle.

Furthermore, an assembly with at least two optical devices is conceivable. This means that at least two optical devices can be arranged side by side, wherein especially the surfaces of the optical devices are substantially on one level. If the assembly includes more than two optical devices, it is also conceivable for the optical devices to be arranged in a line, for instance, and/or in a quadrangle and/or a rhombus, for example.

The assembly with at least two optical devices may be connectable in particular to another component; for instance, the sound level of a component may be controlled by the assembly. For this purpose, for instance, two optical devices of the assembly may be designed with an input possibility so that the observer of the optical device can make an input to control the sound level. Preferably, the optical devices may additionally output a signal to the observer that, for instance, the sound level was controlled in that one and/or a plurality of light sources are switched on and/or off in the optical device that was operated, for example, and/or in a further optical device one or a plurality of light sources may be switched on and/or off, for example. This may especially enhance operator convenience.

It is moreover conceivable, especially if two or more optical devices are arranged in an assembly and/or at a vehicle, and/or a further element, that at least one optical device can, for instance, via pulse width modulation (PWM), transmit data received from one of the other optical devices and/or from the further element. In other words, it is possible to transmit data via the optical device with light corresponding to a Visual Light Communication (VLC).

Preferably, the optical device is integrated into a vehicle; the optical device may, for instance, be used as a tail light. Another possibility of integrating the optical device in a vehicle is to locate the optical device in the interior of the vehicle and/or, for instance, also in the region of the engine. The optical device may, for instance, display the charging state of a battery and/or a fuel gage. In the engine compartment the optical device may, for instance, be used for indicating the amount of oil.

The vehicle may be an aircraft or a water-based vehicle or a land-based vehicle. The land-based vehicle may be a motor vehicle or a rail vehicle or a bicycle. It is particularly preferred for the vehicle to be a truck or a passenger car or a motorcycle. The vehicle may further be designed as a non-autonomous or a part-autonomous or an autonomous vehicle.

The light sources may each be designed as a light emitting diode (LED), for instance, as a mini LED and/or micro LED, and/or as an organic LED (OLED), and/or as a laser diode, and/or as an illuminant operating pursuant to a Laser Activated Remote Phosphor (LARP) principle, and/or as a halogen lamp, and/or as a gas discharge lamp (High Intensity Discharge (HID)), and/or in connection with a projector operating pursuant to a Digital Light Processing (DLP) principle. Thus, a variety of alternatives is available as a light source for the illumination device in accordance with the invention.

A method for interaction with the optical device includes the switching on and/or switching off of at least one light source of at least one optical system if the input possibility is, for instance, actuated by an observer. The change caused by the actuation of the input possibility may exist for a short and/or for a longer period.

An optical device includes at least two optical systems each comprising an individually controllable light source. Furthermore, a respective optical system includes a light guide into which the light of the respective light source can be input. Moreover, a respective optical system includes a light output side, and the second optical system additionally includes a light input side into which light exiting from the light output side of the first optical system irradiates. Moreover, an image mask is arranged between the optical systems such that it is located in the optical path between the light output side of the first optical system and the light input side of the second optical system.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
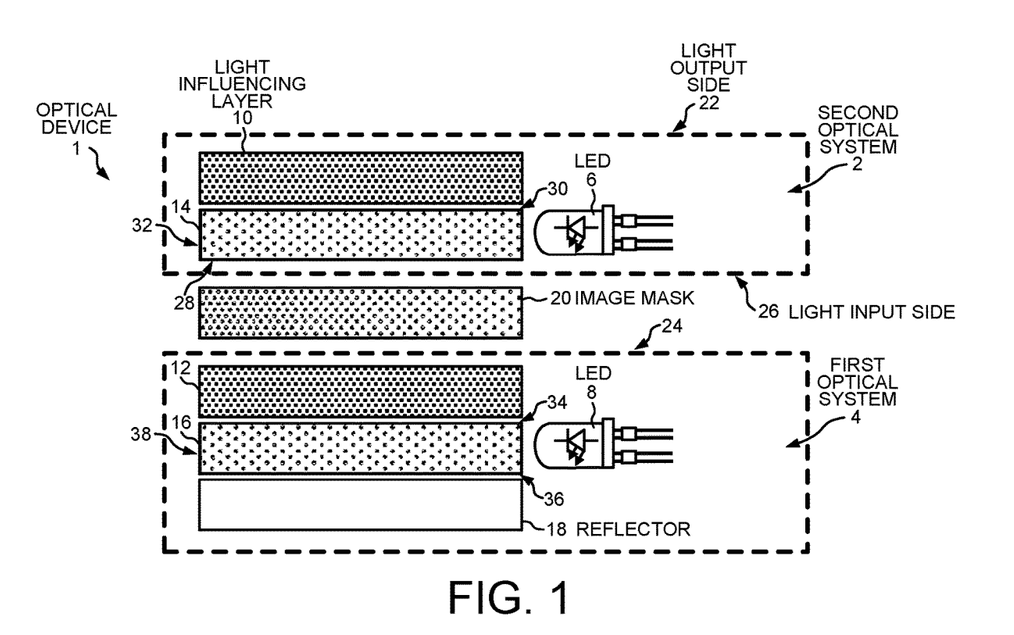
FIG. 1 is a schematic structure of an optical device in accordance with a first embodiment.

FIG. 1 illustrates an optical device 1 that includes a second optical system 2 and a first optical system 4. They each include a light source that is formed as an LED 6, 8. Furthermore, each respective optical system 2, 4 includes a light influencing layer 10, 12 and a respective layered light guide 14, 16. The first optical system 4 moreover includes a reflector 18. Additionally, an image mask 20 is arranged between the optical systems 2, 4, which are arranged in a sandwich-like manner.

Both optical systems 2, 4 include a light output side 22, 24. The light output sides 22, 24, from which light of the respective optical system 2, 4 can be output, are parallel or at least opposite to each other. The second optical system 2 moreover includes a light input side 26 facing the light output side 24 of the optical system 4. In other words, light leaving the light output side 24 may enter the light input side 26. The image mask 20 is arranged between the light output side 24 and the light input side 26. In other words, the light leaves the optical system 4 via the light output side 24, is influenced by the image mask 20, and enters the light input side 26 of the optical system 2.

A respective optical system 2, 4 has a layer-wise structure. In this embodiment, the second optical system 2 includes two layers, the light guide 14 and the light influencing layer 10. In this example, the light influencing layer 10 includes the light output side 22. The light guide 14, however, includes the light input side 26. In other words, light entering through the light input side 26 is first influenced by the light guide 14 and then by the light influencing layer 10 before it exits the optical device 1 through the light output side 22. The light guide 14 moreover has two large surfaces 28, 30, wherein the large surface 28 forms the light input side 26, and the large surface 30 faces the light influencing layer 10. Light may then exit from the large surface 30. In addition to the large surfaces 28, 30, the light guide 14 includes a circumferential wall 32 that is an input face for the LED 6. In other words, light of the LED 6 is input through the circumferential wall 32 into the light guide 14.

The first optical system 4, with respect to the light influencing layer 12, the light guide 16 and the LED 8, has the same structure as that of the optical system 2. In other words, the light guide 16 also includes two large surfaces 34, 36 and a circumferential wall 38, wherein this one serves as an input face of the light of the LED 8. Additionally, the large surface 34 is adjacent to the light influencing layer 12, wherein layer 12 includes the light output side 24. In contrast to the second optical system 2, the first optical system 4 includes the reflector 18, which is also integrated layer-wise into the optical system 4 and which is adjacent to the large surface 36. The reflector 18 is adapted to reflect light radiating in the direction away from the light output side 24 back in the direction of the light output side 24.

Figure 2A:
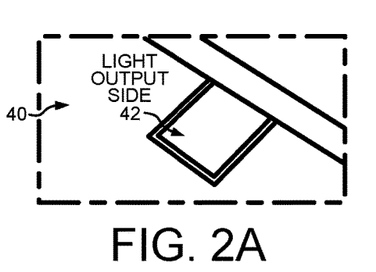
FIG. 2A is an example of a first mode of an optical device in accordance with a second embodiment.

In FIG. 2A, an optical device 40 operated in a third mode is shown. The optical device 40 may, for example, be constructed like the optical device 1 of FIG. 1. This means that the optical device 40 has two optical systems, wherein an image mask is arranged between the optical systems, and the light output side 42 of the second optical system is visible.

In FIG. 2A, the optical device 40 glows over the whole area. This corresponds to a state, with respect to FIG. 1, in which the LED 6 glows and the LED 8 is switched on or off.

Figure 2B:
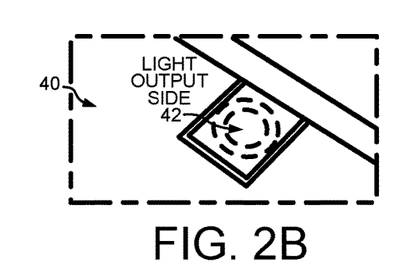
FIG. 2B an example of a second mode of an optical device in accordance with the second embodiment.

In FIG. 2B, the optical device 40 is shown in a different second mode. The optical device 40 includes a symbol at the light output side 42. In order to produce this message, the LED 8 is, with respect to FIG. 1, switched on while the LED 6 is switched off.

Figure 3:
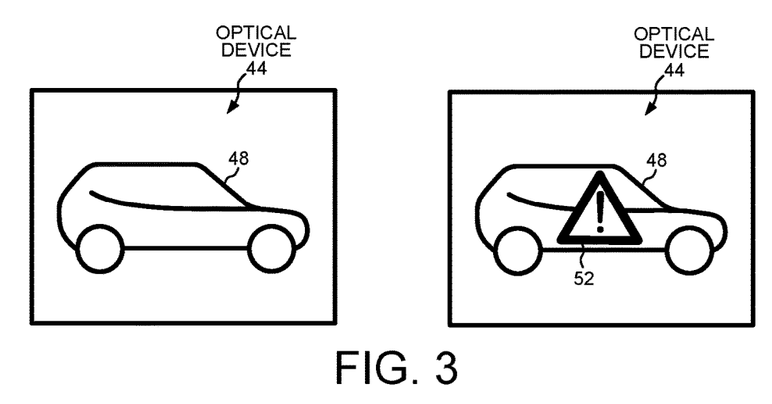
FIG. 3 shows examples of information and/or a message displayed by an optical device in accordance with a further embodiment.

FIG. 3 also illustrates an optical device 44 in two different modes. In a third mode, the light output side 42 shows a vehicle symbol 48, while in the second mode 50, the vehicle symbol 48 is supplemented by a warning signal 52. With respect to FIG. 1, the optical device 1 may, so as to obtain the picture of FIG. 3, be supplemented by a further image mask that is arranged in the optical path after the light output side 22. In other words, the mode 46 would be visible if the LED 6 in FIG. 1 were switched on. The image mask 20 of FIG. 1 would show the warning sign 52, and in order to illustrate the mode 50 the LED 8 would be switched on (see FIG. 1).

Figure 4:
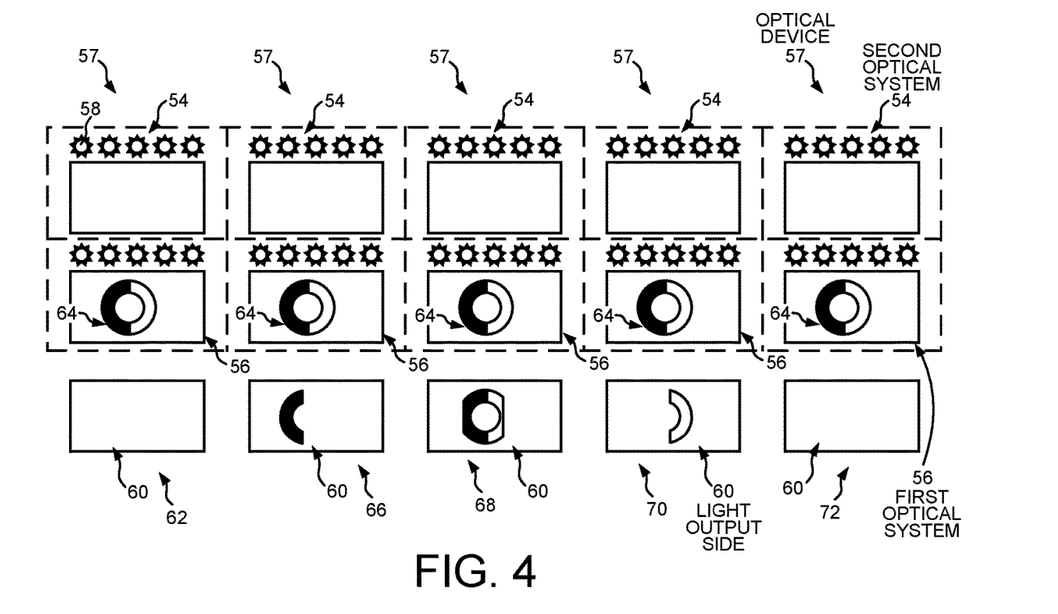
FIG. 4 shows the relation between a picture illustrated by an optical device and the switching on and/or switching off of light sources of the optical systems of the optical device in accordance with a further embodiment.

In FIG. 4 a second optical system 54 and a first optical system 56 are illustrated, both forming together an optical device 57. The optical device 57 is illustrated five times in different states. The optical systems 54 and 56 are arranged on top of each other in the optical device 57 and are illustrated side by side in FIG. 4 for better illustration; compare to optical systems 2, 4 of FIG. 1. The optical systems 54, 56 are illustrated in a schematic top view, which also shows LEDs 58, only one of which is labeled with a reference numeral for the sake of convenience. Each optical system 54, 56 has five LEDs 58 which irradiate laterally into the respective light guide of the optical systems 54, 56. The respective LEDs 58 of an optical system 54, 56 are moreover arranged in a row and irradiate laterally into the light guide, and additionally the LEDs 58 of the optical system 56 are arranged above the LEDs 58 of the optical system 54. Furthermore, FIG. 4 indicates which LEDs are switched on and/or off.

Additionally, a light output side 60 is illustrated in FIG. 4, which shows the picture an observer of the optical device perceives when the LEDs 58 are switched on or off, as is indicated by the different representations of the LEDs which are switched on or off.

The LEDs 58 of the optical devices 54, 56 are switched inversely. This means that the LEDs 58 having the same position in a direction of the optical path are not switched on or off simultaneously.

In FIG. 4 five different possibilities are given which cause five different pictures at the light output side 60. A first picture 62 is produced in that an LED 58, which is arranged to the farthest at the left in this picture, of the optical system 56 is switched on, and correspondingly all LEDs 58 of the optical system 54 are switched on, apart from the LED 58 which is arranged to the farthest at the left. Because an image mask 64 which is arranged in the optical path above the optical system 56 and between the optical systems 64, 56 does not display anything in this region, nothing appears on the picture 62. A uniformly glowing area can be seen. If now the second LED 58 from the left of the optical system 56 is switched on, and thus the second LED 58 from the left of the optical system 54 is switched off, then the part of the image mask which is arranged in the region of the second LED 58 from the left is illustrated in the picture 66. In this case, a part of a black circular ring can be seen in the picture 66, which is illustrated on the image mask 64. Now, the middle LED 58 of the optical system 56 is switched on, and hence the middle LED 58 of the optical system 54 is switched off. The middle of the image mask 64 can now be seen in picture 68. Then, the second LED from the right of the optical system 56 is switched on, and hence the second LED from the right of the optical system 54 is switched off, and thus a region at the right from the middle of the image mask 64 can be seen in the picture 70. Last, the LED at the very right of the optical system 56 is switched on while the LED 58 at the very right of the system 54 is switched off. Because nothing can be seen on the image mask 64, the picture 72 and the picture 62 are uniformly glowing surfaces.

If this process of the switching on and off of different LEDs 58 is performed quickly, an animation may be produced.

Figure 5:
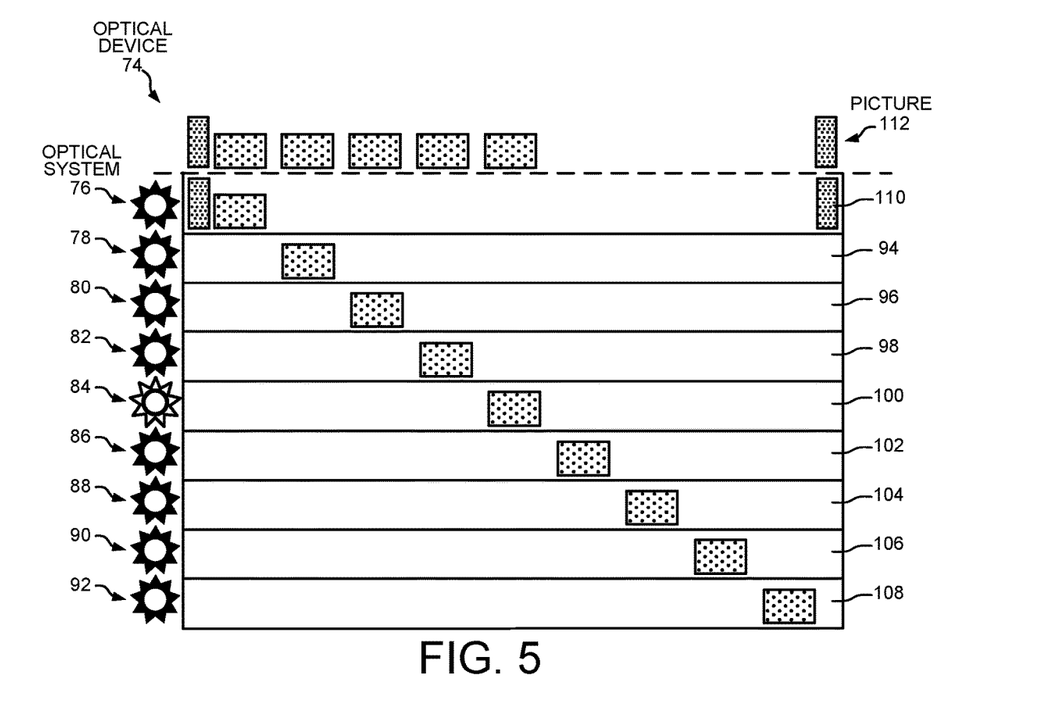
FIG. 5 is an optical device with a plurality of optical systems in accordance with a further embodiment.

In FIG. 5 an optical device 74 is shown which includes nine optical systems 76 to 92. The optical systems are arranged on top of each other, compare to FIG. 1, and are illustrated side by side in FIG. 5 so that the image masks are visible. The optical system 76 corresponds to the second optical system, and the optical system 92 corresponds to the first optical system, also compare to FIG. 1. The optical device 74 illustrates, for instance, a progress indicator. FIG. 5 shows how such progress indicator may be constructed. On each image mask 94 to 108, progress beams are shown which are offset from each other. The progress beams do not intersect in their position in a direction that is parallel to the optical path of the light. Furthermore, the image masks 94 to 108 are arranged between the optical systems 76 to 92. This means that, for instance, the image mask 108 is arranged between the optical system 92 and the optical system 90. The image mask 106 is arranged between the optical system 90 and the optical system 88. The image mask 104 is arranged between the optical system 88 and the optical system 86, etc. Moreover, the optical device 74 includes an image mask 110 which is arranged in the optical path of the optical device 74 above the optical system 76. The image mask 110 includes, in addition to a progress beam, two confinement beams that confine the maximum and the minimum performance. The image mask 110 can be seen in the picture 112 whenever any of the LEDs of the optical systems 76 to 92 is switched on. In the picture 112, which can be seen when observing the optical device 74, the image masks 94 to 110 are projected that are arranged between the light source which is switched on at that moment and the image mask 110. In this example, the LED of the optical system 84 is switched on, and thus the image masks 94 to 100 and the image mask 110 can be seen in the picture 112.

Figures 6A, 6B:
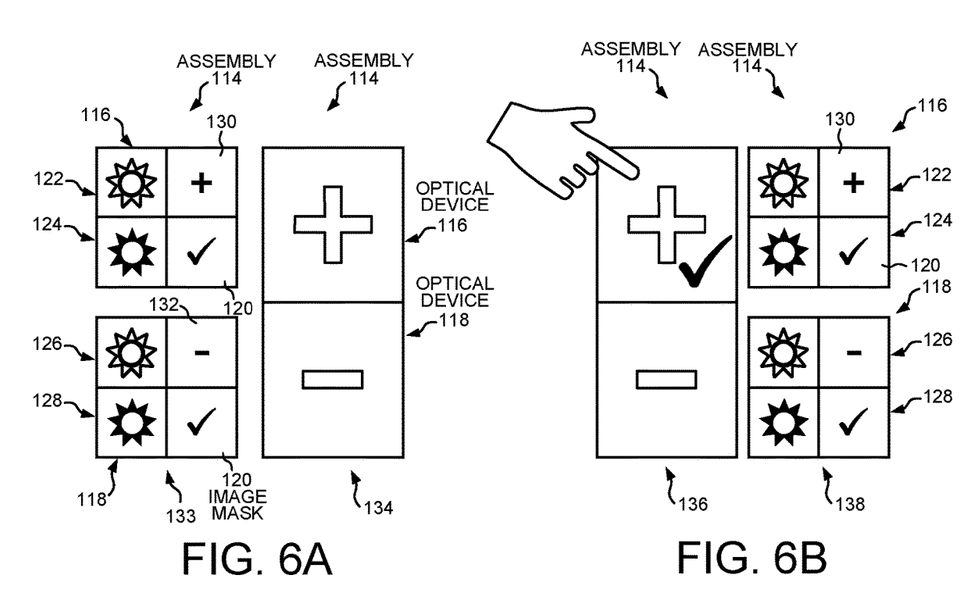
FIG. 6A is an example of an interaction with an assembly of optical devices in accordance with an embodiment.
FIG. 6B is another example of an interaction with an assembly of optical devices in accordance with an embodiment.

FIG. 6A shows an assembly 114 of optical devices 116 and 118. Each of the optical devices 116, 118 includes two optical systems and two image masks. The lower image mask 120 is identical in both optical devices 116, 118 and shows a check mark. This image mask is arranged between the optical systems 122 and 124 of the optical device 116 and between the optical systems 126 and 128 of the optical device 118. Furthermore, the optical device 116 includes an image mask 130 with a plus sign, and the optical device 118 includes an image mask 132 with a minus sign. Next to the first illustration 133 at the very left, which shows the structure of the assembly 114, an illustration 134 further to the right shows the assembly 114 with the optical devices 116, 118, such as is seen by the observer. If an LED of the optical system 122 and an LED of the optical system 126 are switched on, as shown by the differently illustrated LEDs in illustration 133, the plus and the minus signs are visible for the observer on the assembly 114.

The optical device 116 and the optical device 118 also include a sensor or a sensor film, which is not visible, and which is capacitive or pressure-sensitive.

In FIG. 6B, the sensor film of the optical device 116 is touched, which is shown in the illustration 136. The optical devices 116, 118 may be programmed such that, on actuation of the sensor film, the LED of the optical system 122 is switched off when the sensor film of the optical device 116 is touched, or the LED of the optical system 126 is switched off when the sensor film of the optical device 118 is touched. At the same time, the LED of the optical system 124 or 128 is correspondingly switched on in the case of touch so that the LEDs are operated inversely. In this example, the LED of the optical system 124 is switched on, as indicated in illustration 138 by differently illustrated LEDs so that the image mask 120 can be seen simultaneously with the image mask 130, which is shown in illustration 136. The optical device 116 shows in this example the check mark in addition to the plus sign. This state may remain for a shorter or for a longer state.

REFERENCE NUMERALS optical device 1, 40, 44, 74, 116, 118
optical system 2, 4, 54, 56, 76-92, 122-128
LED 6, 8, 58
light influencing layer 10, 12
light guide 14, 16
reflector 18
image mask 20, 64, 94-110, 130, 132
light output side 22, 24, 42
light input side 26
large surface 28, 30, 34, 36
wall 32, 38
vehicle symbol 48
warning sign 52
picture 62, 66-72, 112, 134
assembly 114
representation 133, 134, 136, 138

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. An optical device, comprising:
a first optical system including a first light source, a third light source, a first light guide, a first light influencing layer and a first light output side, wherein the first light source and the third light source are adapted to be individually controlled, wherein the first light guide is adapted to receive light output by the first light source, wherein the first light influencing layer is disposed between the first light guide and the first light output side, and wherein the first light influencing layer is a brightness enhancement film;
a second optical system including a second light source, a fourth light source, a second light guide, a second light output side and a light input side, wherein the second light source and the fourth light source are adapted to be individually controlled, wherein the second light guide is adapted to receive light output by the second light source, and wherein light exiting from the first light output side of the first optical system enters the light input side of the second optical system and is guided through the second light guide to the second light output side; and
an image mask disposed between the first light output side of the first optical system and the light input side of the second optical system, wherein the image mask prevents a portion of the light that exits from the first light output side of the first optical system from entering the light input side of the second optical system so as to generate a pattern in the light that exits the second light output side.

2. The optical device of claim 1, wherein the first light output side of the first optical system is adjacent to the light input side of the second optical system.

3. The optical device of claim 1, wherein the first optical system, the image mask and the second optical system are formed as layers on top of each other.

4. The optical device of claim 1, wherein the second light guide includes an input large surface, an output large surface and a perimeter wall, and wherein light from the second light source enters the second light guide through the perimeter wall.

5. The optical device of claim 4, wherein light from the first light source enters the second light guide through the input large surface.

6. The optical device of claim 1, wherein the second optical system further includes a second light influencing layer, wherein the second optical system is formed in layers, and wherein the second light guide and the second light influencing layer are formed as layers on top of each other.

7. The optical device of claim 6, wherein light exiting the second light guide enters the second light influencing layer before exiting the second light output side of the second optical system.

8. The optical device of claim 1, wherein the first optical system further includes a reflector disposed adjacent to the first light guide, and wherein the first light guide is disposed between the reflector and the first light output side.

9. The optical device of claim 1, further comprising:
a sensor through which the optical device receives information from a user of the optical device.

10. The optical device of claim 9, wherein the sensor is selected from the group consisting of: a camera and a touch screen.

11. The optical device of claim 1, wherein the first light source is a light emitting diode (LED).

12. The optical device of claim 1, wherein the pattern is selected from the group consisting of: a symbol, a logo, a picture, a progress bar, a message, and a warning notice.

13. The optical device of claim 1, wherein the image mask is a graphical optical blackout.

14. The optical device of claim 1, wherein the optical device is part of a vehicle.

15. A method of using an optical device, comprising:
actuating a sensor of the optical device so as to switch on a first light source of a first optical system, wherein the optical device includes the first optical system, a second optical system and an image mask, wherein the first optical system includes the first light source, a third light source, a first light guide, a first light influencing layer and a first light output side, wherein the first light source and the third light source are adapted to be individually controlled, wherein the first light guide is adapted to receive light output by the first light source, wherein the first light influencing layer is disposed between the first light guide and the first light output side, and wherein the first light influencing layer is a brightness enhancement film, wherein the second optical system includes a second light source, a second light guide, a second light output side and a light input side, wherein the second light guide is adapted to receive light output by the second light source, wherein light exiting from the first light output side of the first optical system enters the light input side of the second optical system and is guided through the second light guide to the second light output side, wherein the image mask is disposed between the first light output side of the first optical system and the light input side of the second optical system, wherein the image mask prevents a portion of the light that exits from the first light output side of the first optical system from entering the light input side of the second optical system so as to generate a pattern in the light that exits the second light output side.

16. The method of claim 15, wherein the sensor is a camera or a touch screen, and wherein the pattern is selected from the group consisting of: a symbol, a logo, a picture, a progress bar, a message, and a warning notice.

\* \* \* \* \*